(12) United States Patent
Parlin

(10) Patent No.: US 10,871,401 B1
(45) Date of Patent: *Dec. 22, 2020

(54) SYSTEM, DEVICE, AND METHOD FOR TRIGGERING MOTION DETECTOR

(71) Applicant: William C. Parlin, Williamsburg, MI (US)

(72) Inventor: William C. Parlin, Williamsburg, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 16/867,137

(22) Filed: May 5, 2020

Related U.S. Application Data

(63) Continuation-in-part of application No. 16/512,094, filed on Jul. 15, 2019, now Pat. No. 10,679,475.

(51) Int. Cl.
| | | |
|---|---|---|
| *G08B 23/00* | (2006.01) | |
| *G01J 5/00* | (2006.01) | |
| *G08B 13/19* | (2006.01) | |
| *H05B 47/13* | (2020.01) | |
| *G01P 13/00* | (2006.01) | |
| *G01J 5/10* | (2006.01) | |

(52) U.S. Cl.
CPC ............. *G01J 5/0025* (2013.01); *G01J 5/10* (2013.01); *G01P 13/00* (2013.01); *G08B 13/19* (2013.01); *H05B 47/13* (2020.01)

(58) Field of Classification Search
CPC .... G08B 13/19; G08B 25/008; H05B 47/105; F21V 23/0478
See application file for complete search history.

(56) References Cited

U.S. PATENT DOCUMENTS

| | | | |
|---|---|---|---|
| 6,762,686 B1 * | 7/2004 | Tabe .................. | G08B 25/08 340/541 |
| 8,410,973 B2 * | 4/2013 | Harrington ............. | G01S 7/497 342/28 |
| 2014/0292507 A1 * | 10/2014 | Null ................... | G08B 13/1645 340/523 |
| 2018/0059227 A1 * | 3/2018 | Tan .................... | G01S 7/497 |

* cited by examiner

*Primary Examiner* — Munear T Akki
(74) *Attorney, Agent, or Firm* — Olav M. Underdal; IDP Patent Services

(57) ABSTRACT

A motion sensor trigger system includes: a motion detector with a motion sensor that can be a passive infrared sensor; an external system; a trigger device including a trigger assembly, which includes a trigger body, a trigger transmitter assembly, at least one connector patch; and a control unit; and a remote control device; such that the trigger transmitter assembly emits a moving trigger signal that can be a moving thermal signal, which activates the motion detector. Also disclosed is a method of motion sensor activation, including positioning trigger device, sending moving trigger signal, activating motion detector, and activating external system.

20 Claims, 7 Drawing Sheets

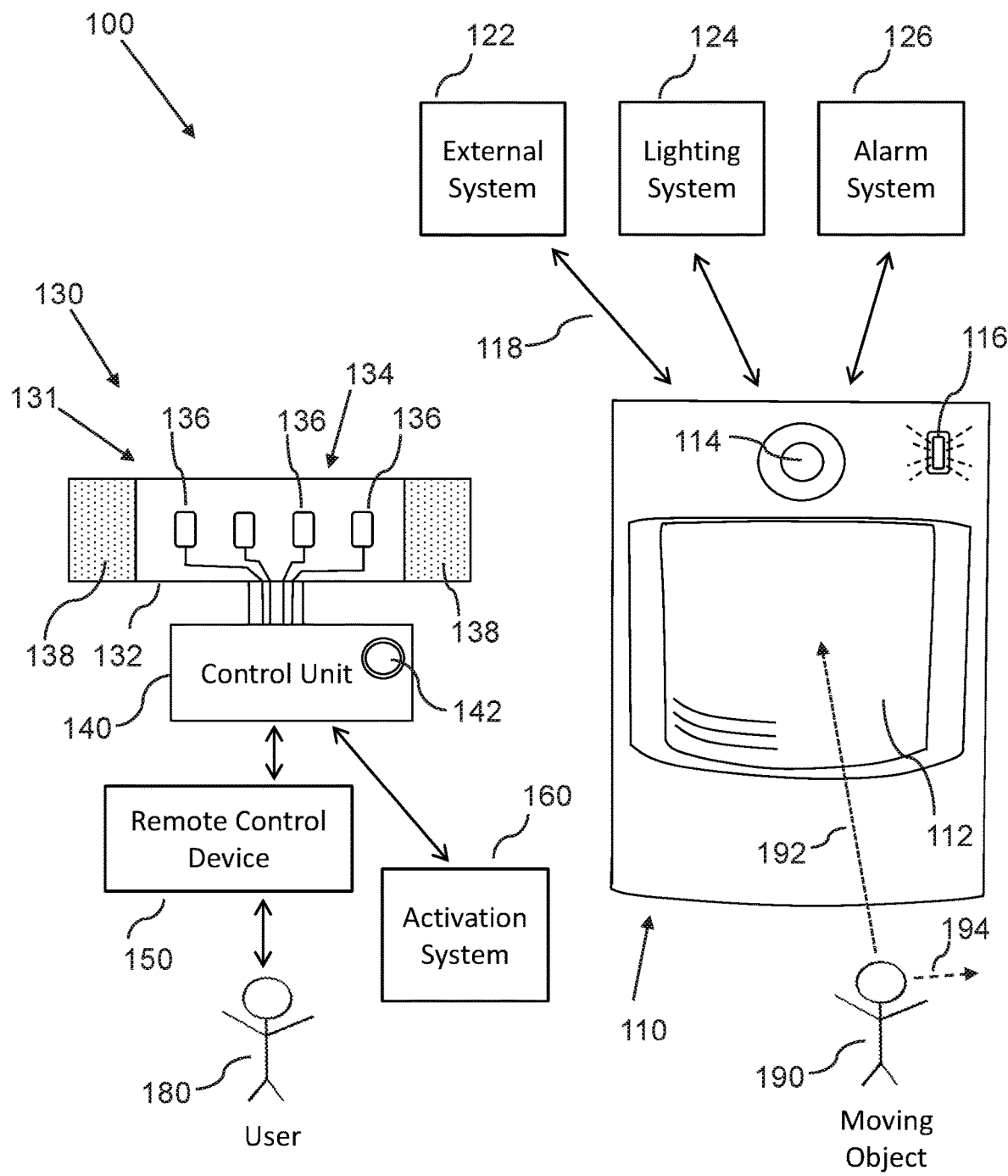

Trigger Device

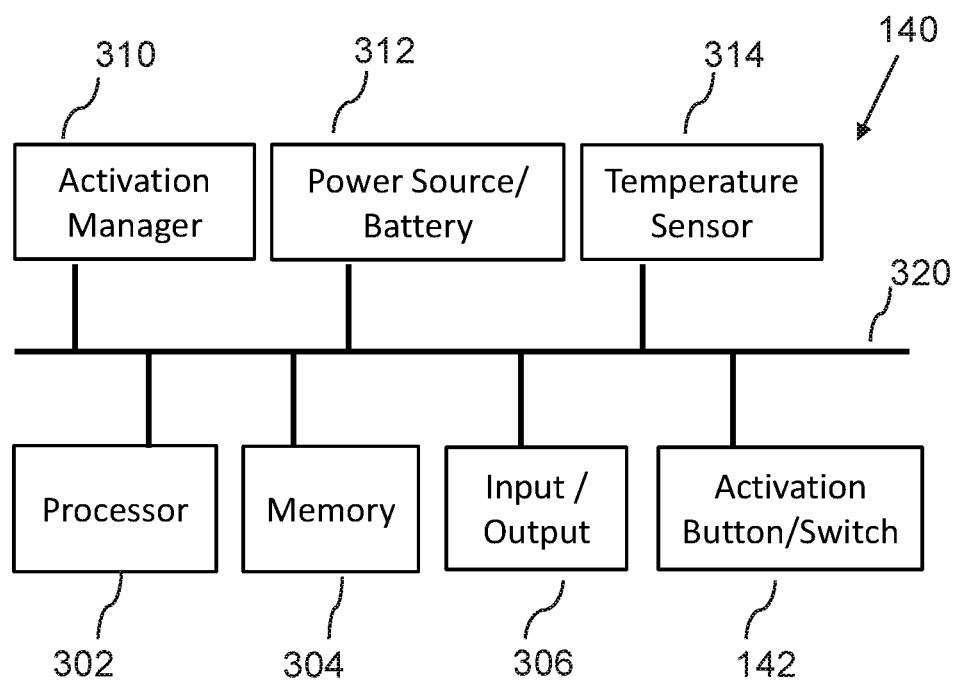

Remote Control Device

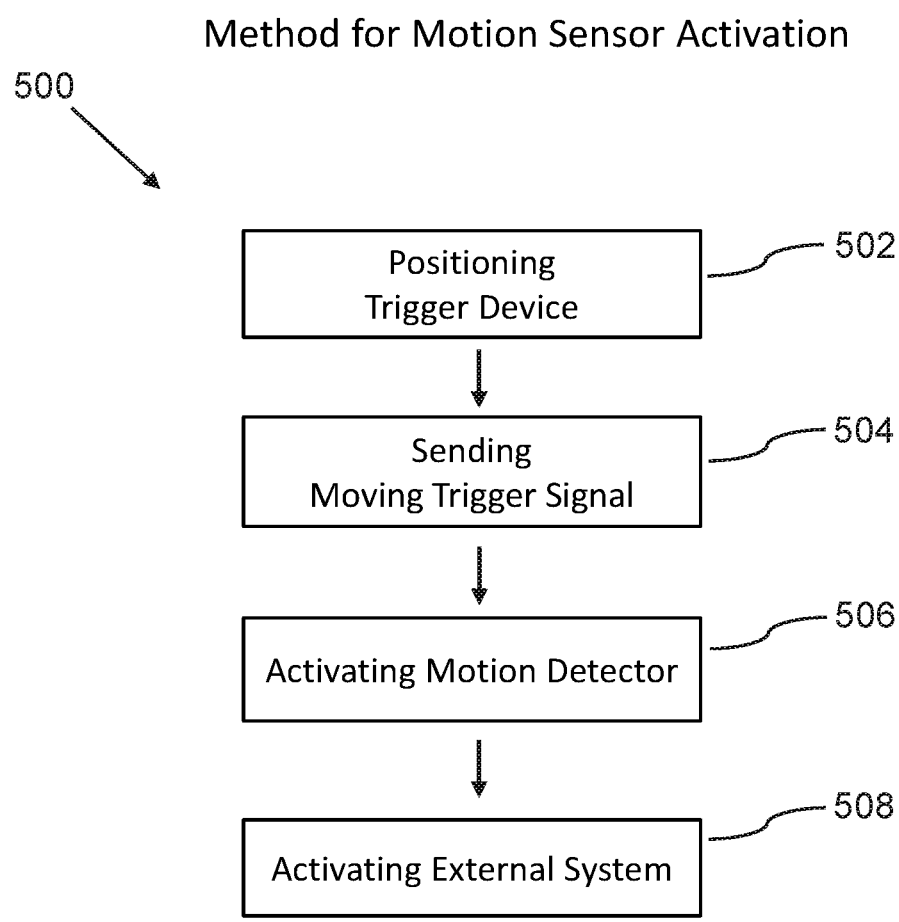

SYSTEM, DEVICE, AND METHOD FOR TRIGGERING MOTION DETECTOR

CROSS-REFERENCE TO RELATED APPLICATIONS

This U.S. Non-Provisional Application is a continuation in part of U.S. Non-Provisional application Ser. No. 16/512,094, filed Jul. 15, 2019; which is hereby incorporated herein by reference in its entirety.

FIELD OF THE INVENTION

The present invention relates generally to the field of motion detector enabled systems, and more particularly to methods and systems for triggering a motion detector.

BACKGROUND OF THE INVENTION

Use of motion sensor enabled systems has become ubiquitous particularly in relation to automatic switching of outdoor and indoor lighting and activation of cameras and alarm systems.

However, such systems can typically only be activated by physical motion within a fixed field of view, but will not allow for triggering via other means, such as for example remote electronic communication.

As such, considering the foregoing, it may be appreciated that there continues to be a need for novel and improved devices and methods for triggering motion detectors, such as passive infrared motion detectors, and activating motion detector enabled systems.

SUMMARY OF THE INVENTION

The foregoing needs are met, to a great extent, by the present invention, wherein aspects of this invention provide enhancements to the existing models for triggering motion detectors and activating motion detector enabled systems.

In an aspect, a motion sensor trigger system can include:
a) a motion detector, which can include:
  i. a motion sensor, which can be a passive infrared sensor, which detects movement of an external object via detection of a moving object signal, such that the motion sensor is triggered when the motion sensor detects movement;
  ii. a camera, which takes a picture when the motion sensor is activated; and
  iii. an activation light, which emits a light signal when the motion sensor is activated;
b) an external system, which is connected to the motion detector, such that the external system is activated when the motion sensor detects a movement;
c) a trigger device, which can include:
  i. a trigger assembly, including:
    1) a trigger body;
    2) a trigger transmitter assembly that is connected to the trigger body, such that the trigger transmitter assembly is configured to emit a moving trigger signal, which can be a moving thermal signal, which moves from a first side to a second side of the trigger transmitter assembly, when the trigger transmitter assembly receives an activation signal, such that the trigger transmitter assembly can include a plurality of trigger transmitters, which can be heat emitting elements, wherein each trigger transmitter in the plurality of trigger transmitters is activated in sequence in order to generate the moving trigger signal, such that the motion sensor detects the moving trigger signal, and thereby activates the motion detector; and
    3) at least one connector patch mounted on the trigger body, such that the connector patch is configured to be detachably attachable to the motion detector, such that the trigger transmitter assembly is positioned adjacent to, i.e. on or near, the motion sensor; and
  ii. a control unit, which is configured to control activation of the trigger transmitter assembly by sending the activation signal to the trigger transmitter assembly; and
d) a remote control device, which is configured to enable a user to send the activation signal to the control unit;
wherein the trigger device is connected to the motion detector, such that the trigger transmitter assembly is adjacent to the motion sensor;
wherein the motion sensor detects the moving trigger signal, and thereby activates the motion detector
wherein each trigger transmitter in the plurality of trigger transmitters is activated in sequence in order to simulate a movement, such that the motion sensor detects the movement, and thereby activates the motion detector.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 1A is a schematic diagram illustrating a motion sensor trigger system prior to mounting of a trigger device on a motion detector, according to an embodiment of the invention.

FIG. 3 is a schematic diagram illustrating a control unit of the trigger device, according to an embodiment of the invention.

FIG. 5 is a flowchart illustrating steps that may be followed, in accordance with one embodiment of a method or process of motion sensor activation.

DETAILED DESCRIPTION

Figure 1B:
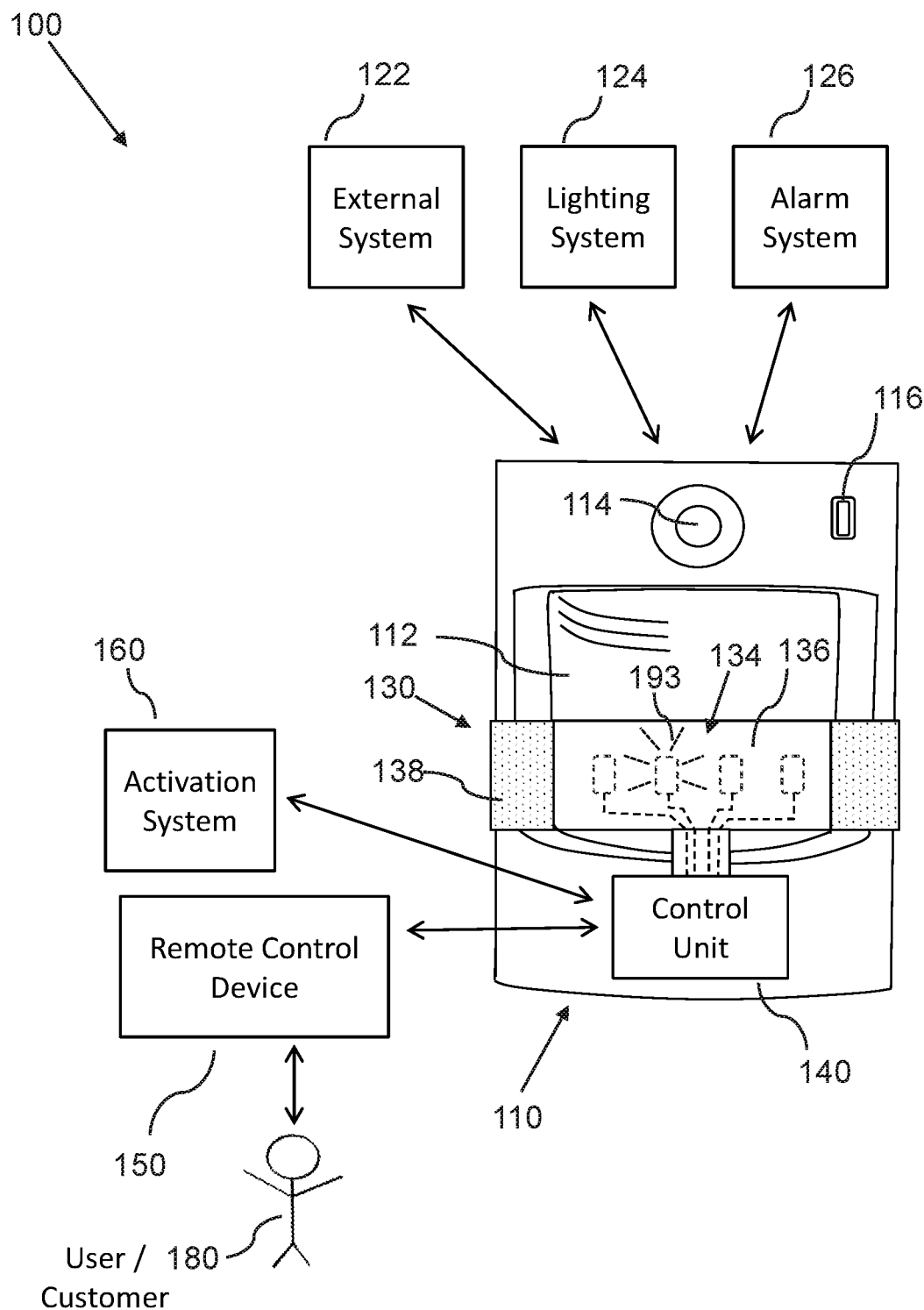
FIG. 1B is a schematic diagram illustrating a motion sensor trigger system with the trigger device mounted on the motion detector, according to an embodiment of the invention.

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

In the following, we describe the structure of an embodiment of a motion sensor trigger system 100 with reference to FIGS. 1A and 1B, in such manner that like reference numerals refer to like components throughout; a convention that we shall employ for the remainder of this specification.

Figure 2A:
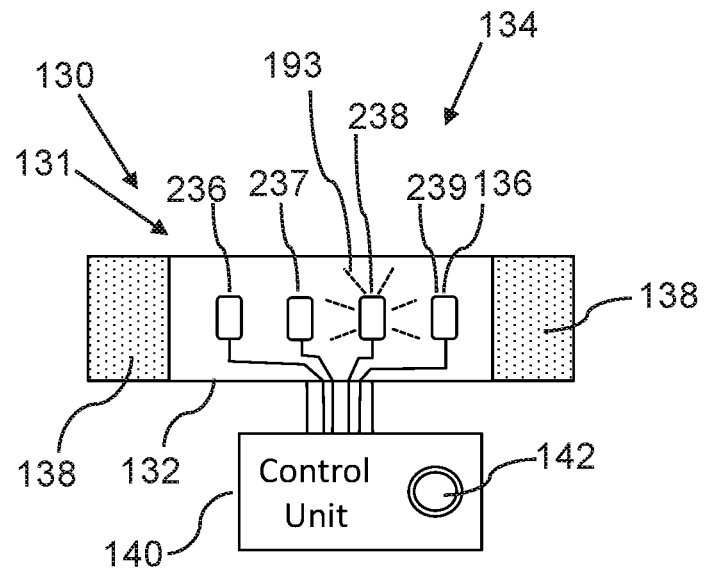
FIG. 2A is a schematic diagram illustrating a trigger device of a motion sensor trigger system, according to an embodiment of the invention.

In an embodiment, as shown in FIGS. 1A, 1B, and 2A, a motion sensor trigger system 100 can include:
a) a motion detector 110, which can include:
  i. a motion sensor 112, which is configured to detect movement 194 of an external object 190 via detection of a moving object signal 192, such that the motion sensor 112 is triggered when the motion sensor detects movement 194;
  ii. a camera 114, which can alternatively be an external camera 114, such that the camera 114 is configured to take a picture when the motion sensor is activated;
  iii. an activation light 116, which emits a light signal when the motion sensor 112 is activated;
b) an external system 122, which is connected to the motion detector 110, such that the external system 122 is activated when the motion sensor 112 detects a movement, wherein the external system 122 for example can be:
  i. a lighting system 124, such that the lighting system 124 is switched on when the motion sensor 112 detects a moving trigger signal; or
  ii. an alarm system 126, such that the alarm system 126 is activated when the motion sensor 112 detects a moving trigger signal;
c) a trigger device 130, which can include:
  i. a trigger assembly 131, which can include:
    1) a trigger body 132;
    2) a trigger transmitter assembly 134, which is connected to (or mounted to) the trigger body 132, such that the trigger transmitter assembly 134 is configured to emit a moving trigger signal 193, which moves from a first side to a second side of the trigger transmitter assembly, when the trigger transmitter assembly 134 receives an activation signal, such that the trigger transmitter assembly 134 can include a plurality of trigger transmitters 136, which can be infrared/heat emitting elements 136,
      wherein each trigger transmitter in the plurality of trigger transmitters is activated in sequence in order to generate the moving trigger signal 193, such that the motion sensor detects the moving trigger signal 193, and thereby activates the motion detector; and
    3) at least one connector patch 138 mounted on the trigger body 132, such that the at least one connector patch 138 can be configured to be detachably attachable to the motion detector 110, such that the trigger transmitter assembly 134 is positioned adjacent to (including on or near) the motion sensor 112, as shown in FIG. 1B; and
  ii. a control unit 140, which is configured to control activation of the trigger transmitter assembly 134 by sending the activation signal to the trigger transmitter assembly. The control unit 140 can include an activation button/switch 142, for example implemented as a momentary switch, such that the activation signal is sent when the activation button/switch 142 is pressed by a user 180; and
d) optionally, a remote control device 150, which is configured to enable a user 180 to send the activation signal to the control unit 140;
wherein the trigger device 130 is connected to the motion detector (or wherein the trigger device is configured to be connectable to a motion detector which includes a motion sensor), such that the trigger transmitter assembly is adjacent to the motion sensor, as shown in FIG. 1B;
wherein the motion sensor detects the moving trigger signal, and thereby activates the motion detector
wherein each trigger transmitter 236, 237, 238, 239, 136 in the plurality of trigger transmitters 134 is activated (switched on) in sequence in order to simulate a movement, such that the motion sensor 112 detects the movement, and thereby activates the motion detector 110. Since the trigger transmitters are activated one after the other, in sequence, it can alternatively be stated that the motion sensor 112 interprets the simulated movement as physical movement, and thereby activates the motion detector 110.

In a related embodiment, the trigger transmitter assembly 134 can be positioned on the motion sensor 112, such that the trigger transmitters 136 will be distributed within view of the motion sensor 112.

In another related embodiment, the trigger transmitter assembly 134 can be mounted on an inner side of the trigger body 132. Alternatively, if the trigger body 132 is made of an infrared-transmitting material, the trigger transmitter assembly 134 can be mounted on an outer side of the trigger body 132, or inside the trigger body 132, wherein the trigger transmitter assembly 134 is embedded in an interior of the trigger body 132, such as for example between two sheets of the trigger body 132 or molded inside the interior of the trigger body 132.

Figure 2B:
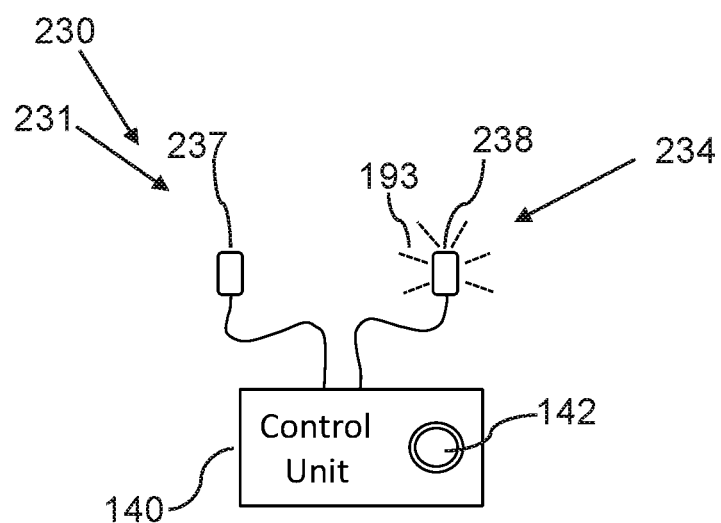
FIG. 2B is a schematic diagram illustrating a trigger device of a motion sensor trigger system, according to an embodiment of the invention.
Figure 2C:
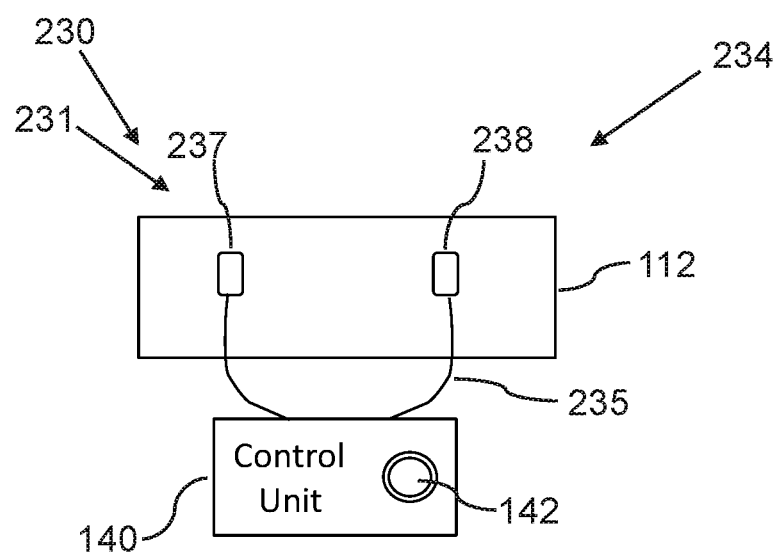
FIG. 2C is a schematic diagram illustrating a trigger device of a motion sensor trigger system, according to an embodiment of the invention.

In another related embodiment, as shown in FIGS. 2B and 2C, a trigger device 230 can include a trigger assembly 131 which does not have a trigger body 132, such that the trigger transmitters 136 are independently positionable, such that the trigger assembly 231 can include:

a trigger transmitter assembly 234, which configured to emit a moving trigger signal 193, which moves from a first side to a second side of the trigger transmitter assembly 234, when the trigger transmitter assembly 234 receives an activation signal, such that the trigger transmitter assembly 134 can include a plurality of trigger transmitters 237, 238, which can be infrared/heat emitting elements 136, wherein each trigger transmitter 237, 238 in the plurality of trigger transmitters 237, 238 is activated in sequence in order to generate the moving trigger signal 193, such that the motion sensor detects the moving trigger signal, and thereby activates the motion detector; and In various related embodiments, the use of independently positionable trigger transmitters 237, 238 can provide additional applications for the trigger device 230. By positioning the trigger transmitters 136 on opposite sides of the motion sensor 112, the motion sensor 112 remains unobscured and can detect motion 194 in its originally-intended way, such that for example, a user 180 can manually turn on their hallway night light, or yard light, when they hear some noise but no motion 194 was detected yet. To make the motion detector 110 only respond to manual triggering via the trigger device 230, the user 180 can cover/cloak the motion sensor 112 and trigger transmitters 136 with infrared-absorbing material, such as infrared-opaque tape, such that the motion detector 110 cannot detect actual physical motion 194, but can still be activated via the trigger device 230.

Figure 2D:
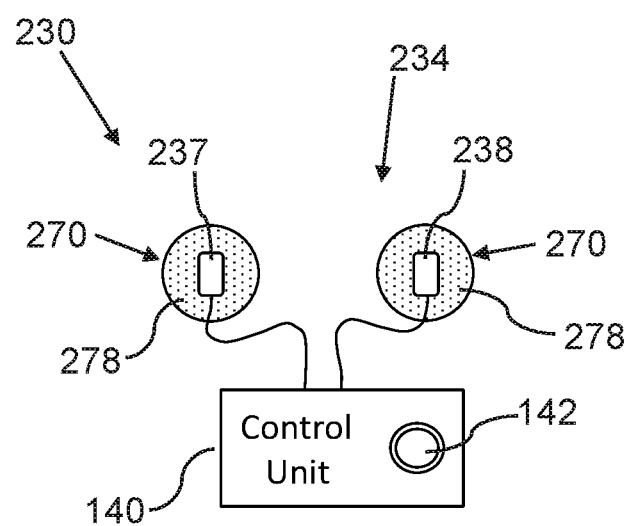
FIG. 2D is a schematic diagram illustrating a trigger device of a motion sensor trigger system, according to an embodiment of the invention.
Figure 4:
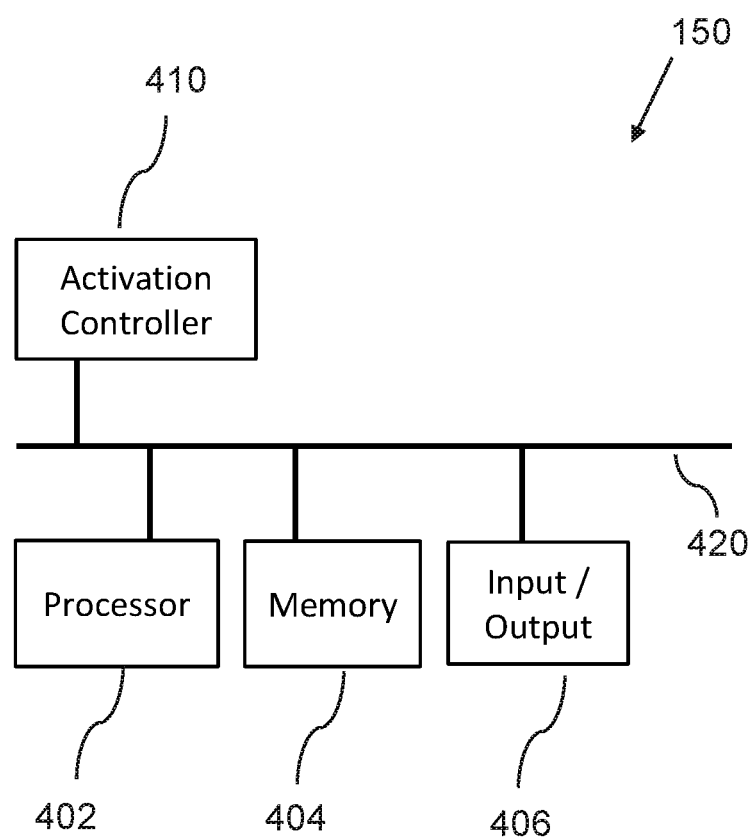
FIG. 4 is a schematic diagram illustrating a remote control device of a motion sensor trigger system, according to an embodiment of the invention.

In a further related embodiment, as shown in FIGS. 2B, 2C, and 2D, the plurality of trigger transmitters 237, 238 can be two trigger transmitters 237, 238. Experimental analysis indicate that conventional motion detectors 110, such as those equipped with a Fresnel lens and a pyroelectric sensor/detector, will be reliably triggered by a trigger device 130, with two trigger transmitters 237, 238 positioned within view of the motion sensor 112.

In another further related embodiment, as shown in FIG. 2C, the trigger transmitters 237, 238 can be configured with a flexible and adjustable connecting cable 235, such that the trigger transmitters 237, 238 can be independently positioned in an adjustable suspended (i.e. "floating") position in front of and adjacent to the motion sensor 112.

In another related embodiment, as shown in FIG. 2D, the trigger transmitter assembly 234 can comprise a plurality of transmitter members 270, each transmitter member 270 comprising:

a) a connector patch 278, which for example can be made of a hook-and-loop fastener or pressure sensitive adhesive, such that the connector patch 278 can be configured to be detachably attachable to the motion detector 110, such that the transmitter member 270 can be detachably positioned on or near to the motion sensor 112, as shown in FIG. 2C; and b) a trigger transmitter 237, 238, which is connected to the connector patch 278, such as on an inner or outer surface of the connector patch 278 or inside the connector patch 278.

In a related embodiment, the motion sensor 112 can be a passive infrared sensor 112 and the moving trigger signal 192 can be a moving thermal signal 192.

In a further related embodiment, the moving thermal signal 192 can have a wavelength in a range of 5-15 microns.

In another related embodiment, the trigger transmitters 236, 237, 238, 239, 136 can be infrared emitting elements 236, 237, 238, 239, 136, which can also be referred to as heat emitting elements 236, 237, 238, 239, 136.

In a further related embodiment, the infrared emitting elements 236, 237, 238, 239, 136 can be thick-film carbon resistors 236, 237, 238, 239, 136, which are configured as heat emitting elements 236, 237, 238, 239, 136. Alternatively, in other further related embodiments, the infrared emitting elements 236, 237, 238, 239, 136 can be thin-film carbon resistors, carbon composition resistors, metal film resistors, metal oxide film resistors, wire wound resistors, polymer thick film resistors, or other types of resistive and conductive elements that will generate heat and emit infrared radiation.

In a related embodiment, a control unit 140 can include:
a) A processor 302;
b) A non-transitory memory 304;
c) An input/output component 306;
d) An activation manager 310, which can be configured to control activation of the trigger transmitter assembly;
e) A power source 312, such as a battery 312; all connected via
f) A data bus 320.

In a related embodiment, a remote control device 150 can include:
a) A processor 402;
b) A non-transitory memory 404;
c) An input/output 406;
d) An activation controller 410, which is configured to send an activation signal to the control unit 140 based on an input from the user 180; all connected via
e) A data bus 420.

In a related embodiment, the motion sensor can be a passive infrared sensor, which is sensitive to moving infrared radiation 192 at mid-infrared wavelengths, such as emitted from the skin of a person 190. Correspondingly, the trigger transmitters 136 can be infrared/heat transmitters 136, such as thick-film carbon resistors 136, which are configured as heat emitting elements 136.

Thus, in various related embodiments, the trigger device 130 can be an electronic device, with no moving parts, which triggers a passive infrared motion sensor by generating a simulated moving thermal object.

In various related embodiments, the trigger device 130 can allow virtually any target, event or condition to trigger a motion detector 110, for example in communication with an activation system 160, which could be an alarm system 160 or some other external system 160. The control unit 140 is activated by the momentary closure of a switch, which may be produced by any means. This expands the applications and usefulness of virtually all passive infrared sensor-triggered products. Some typical applications include security, wildlife photography, safety, industrial automation, novelty/amusement, home automation, law enforcement, wireless driveway monitors, point-of-purchase displays, vending machines, etc. All of these systems can be restored to their original motion sensor configuration and operation, easily and quickly, without any tools or electrical skills required. The host device does not need to be permanently altered or modified in any way.

In an example implementation embodiment, the trigger device 130 can be a small electronic device which is powered by four AA batteries 312, connected in series, to produce approximately 6V DC. However, the trigger device 130 can operate with other types of batteries and higher or lower voltages. The circuitry and components can be miniaturized to less than 1 square inch surface area. The batteries provide power to a microcontroller 140, which draws very little current as it awaits the momentary (or continuous) action of a switch, which is connected such that it will change the logic state of a microcontroller port when activated. Once this change is detected, the microcontroller's firmware will initiate an animated, cascading thermal display by energizing each trigger element 136 in sequence, along an array, such that each trigger element 136 emits infrared radiation 192 in the approximate range of 5-15 microns wavelength. This simulated motion is interpreted as physical motion by the motion detector 110.

In a further related embodiment, trigger transmitters 136 can be heat elements 136, which can be thick-film carbon resistors 136, which heat up quickly (within 200 mS) to generate infrared energy in the "body heat" wavelength spectrum that virtually all passive infrared motion sensors 112 are designed to detect. Each heat element 136 can be momentarily energized, on then off, in a sequential manner, which simulates and mimics an animated, "moving" target. As the movement is within view of the motion sensor 112, the passive infrared motion detector is triggered. Thus, through microprocessor control, electric current can be passed through the thick-film carbon resistive elements 136, such that the elements rapidly heat and emit infrared light in the range of 10 um+/−5 um, which correlates to the range of human body temperature that passive infrared motion sensors are designed to detect.

Thus, in a related embodiment, the trigger transmitters 136 can be thick-film carbon resistors 136, which are configured as heat elements 136.

In another related embodiment, the trigger device 130 or control unit 140 can include a temperature sensor 314 which is configured to measure ambient air temperature, such that the control unit 140 can increase (i.e. increases) the power sent to the trigger transmitters/heat elements 136, to compensate and overcome the initial low-temperature state of the heat-emitting elements 136, when ambient temperature is below a predetermined low temperature threshold. The temperature sensor 314 can be a thermistor 314, which can be used to sense temperature and deliver a varying voltage to the microcontroller, which in turn can adjust the heat cycle by using a software look-up table or calculating power according to a predetermined calculation formula. The low temperature threshold can for example be in a range of 0° F.-35° F. or some other range. Testing has indicated that no heat compensation was required until ambient temperature was below 18° F.

In various embodiments, the trigger device 130 can include a varying number of trigger transmitters 136, such as from 2 to 10 trigger transmitters, 2 to 20, or a larger plurality of trigger transmitters 136, which can be arranged in a linear or matrix-array configuration.

In related embodiments, thick-film carbon resistors can have functional advantages, including:
a) 1-10 or a larger number of independent heat emitters 136 allow the heat timing to be changed and controlled easily; and
b) Thick-film carbon resistors are inexpensive, readily available and easy to assemble.

In related embodiments, the remote control device 150 can include configurations as:
a) An electronic device, with an electronic control circuit, and an activation button/switch;
b) A web application, executing in a Web browser;
c) A tablet app, executing on a tablet device, such as for example an ANDROID™ or IOS™ tablet device;
d) A mobile app, executing on a mobile device, such as for example an ANDROID™ phone or IPHONE™, or any wearable mobile device;
e) A desktop application, executing on a personal computer, or similar device; or
f) An embedded application, executing on a processing device, such as for example a smart TV, a game console or other system.

It shall be understood that an executing instance of an embodiment of the motion sensor trigger system 100, as shown in FIG. 1A, can include a plurality of remote control devices 150, which are each tied to one or more users 180.

In an embodiment, as illustrated in FIG. 5, a method for motion sensor activation 500, can include:
a) Positioning trigger device 502, wherein the trigger device 130 is positioned on a motion detector, such that a trigger transmitter assembly of the trigger device 130 is adjacent to the motion sensor, as shown in FIG. 1B;
b) Sending moving trigger signal 504, wherein an activation signal is sent to the trigger device, such that the trigger transmitter assembly generates a moving trigger signal;
c) Activating motion detector 506, wherein the motion sensor detects the moving trigger signal, and thereby activates the motion detector; and
d) Activating external system 508, wherein the external system is activated in communication with the motion detector, when the motion detector is activated.

FIGS. 1A, 1B, 2, 3, 4, and 5 are block diagrams and flowcharts, methods, devices, systems, apparatuses, and computer program products according to various embodiments of the present invention. It shall be understood that each block or step of the block diagram, flowchart and control flow illustrations, and combinations of blocks in the block diagram, flowchart and control flow illustrations, can be implemented by computer program instructions or other means. Although computer program instructions are discussed, an apparatus or system according to the present invention can include other means, such as hardware or some combination of hardware and software, including one or more processors or controllers, for performing the disclosed functions.

In this regard, FIGS. 1A, 1B, 2, 3, and 4 depict the computer devices of various embodiments, each containing several of the key components of a general-purpose computer by which an embodiment of the present invention may be implemented. Those of ordinary skill in the art will appreciate that a computer can include many components. However, it is not necessary that all of these generally conventional components be shown in order to disclose an illustrative embodiment for practicing the invention. The general-purpose computer can include a processing unit and a system memory, which may include various forms of non-transitory storage media such as random access memory (RAM) and read-only memory (ROM). The computer also may include nonvolatile storage memory, such as a hard disk drive, where additional data can be stored.

It shall be understood that the above-mentioned components of the control unit 140 and the remote control device 150 are to be interpreted in the most general manner.

For example, the processors 302 402 can each respectively include a single physical microprocessor or microcontroller, a cluster of processors, a datacenter or a cluster of datacenters, a computing cloud service, and the like.

In a further example, the non-transitory memory 304 and the non-transitory memory 404 can each respectively include various forms of non-transitory storage media, including random access memory and other forms of dynamic storage, and hard disks, hard disk clusters, cloud storage services, and other forms of long-term storage. Similarly, the input/output 306 and the input/output 406 can each respectively include a plurality of well-known input/output devices, such as screens, keyboards, pointing devices, motion trackers, communication ports, and so forth.

Furthermore, it shall be understood that the control unit 140 and the remote control device 150 can each respectively include a number of other components that are well known in the art of general computer devices, and therefore shall not be further described herein. This can include system access to common functions and hardware, such as for example via operating system layers such as WINDOWS™, LINUX™, and similar operating system software, but can also include configurations wherein application services are executing directly on server hardware or via a hardware abstraction layer other than a complete operating system.

An embodiment of the present invention can also include one or more input or output components, such as a mouse, keyboard, monitor, and the like. A display can be provided for viewing text and graphical data, as well as a user interface to allow a user to request specific operations. Furthermore, an embodiment of the present invention may be connected to one or more remote computers via a network interface. The connection may be over a local area network (LAN) wide area network (WAN), and can include all of the necessary circuitry for such a connection.

In related embodiments, the remote control device 150 communicates with the control unit 140 over a network, which can include the general Internet, a Wide Area Network or a Local Area Network, or another form of communication network, transmitted on wired or wireless connections. Wireless networks can for example include Ethernet, Wi-Fi, BLUETOOTH™, ZIGBEE™, and NFC. The communication can be transferred via a secure, encrypted communication protocol.

Typically, computer program instructions may be loaded onto the computer or other general-purpose programmable machine to produce a specialized machine, such that the instructions that execute on the computer or other programmable machine create means for implementing the functions specified in the block diagrams, schematic diagrams or flowcharts. Such computer program instructions may also be stored in a computer-readable medium that when loaded into a computer or other programmable machine can direct the machine to function in a particular manner, such that the instructions stored in the computer-readable medium produce an article of manufacture including instruction means that implement the function specified in the block diagrams, schematic diagrams or flowcharts.

In addition, the computer program instructions may be loaded into a computer or other programmable machine to cause a series of operational steps to be performed by the computer or other programmable machine to produce a computer-implemented process, such that the instructions that execute on the computer or other programmable machine provide steps for implementing the functions specified in the block diagram, schematic diagram, flowchart block or step.

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagrams, schematic diagrams or flowcharts, as well as combinations of blocks or steps, can be implemented by special purpose hardware-based computer systems, or combinations of special purpose hardware and computer instructions, that perform the specified functions or steps.

As an example, provided for purposes of illustration only, a data input software tool of a search engine application can be a representative means for receiving a query including one or more search terms. Similar software tools of applications, or implementations of embodiments of the present invention, can be means for performing the specified functions. For example, an embodiment of the present invention may include computer software for interfacing a processing element with a user-controlled input device, such as a mouse, keyboard, touch screen display, scanner, or the like. Similarly, an output of an embodiment of the present invention may include, for example, a combination of display software, video card hardware, and display hardware. A processing element may include, for example, a controller or microprocessor, such as a central processing unit (CPU), arithmetic logic unit (ALU), or control unit.

Here has thus been described a multitude of embodiments of the motion sensor trigger system 100, the trigger device 130, and methods related thereto, which can be employed in numerous modes of usage.

The many features and advantages of the invention are apparent from the detailed specification, and thus, it is intended by the appended claims to cover all such features and advantages of the invention, which fall within the true spirit and scope of the invention.

Many such alternative configurations are readily apparent, and should be considered fully included in this specification and the claims appended hereto. Accordingly, since numerous modifications and variations will readily occur to those skilled in the art, the invention is not limited to the exact construction and operation illustrated and described, and thus, all suitable modifications and equivalents may be resorted to, falling within the scope of the invention.

What is claimed is:
1. A motion sensor trigger system, comprising:
a) a motion detector, comprising:
a motion sensor, which is configured to detect a movement of an external object via detection of a moving object signal; and
b) a trigger device, comprising:
a trigger assembly, comprising:
a trigger body; and
a trigger transmitter assembly, which is connected to the trigger body, such that the trigger transmitter assembly is configured to emit a moving trigger signal, which moves from a first side of the trigger transmitter assembly to a second side of the trigger transmitter assembly, when the trigger transmitter assembly receives an activation signal;
wherein the trigger device is connected to the motion detector, such that the trigger transmitter assembly is adjacent to the motion sensor, such that the trimer transmitter assembly is on or near the motion sensor, such that the trimer transmitter assembly is within view of the motion sensor;
wherein the moving trigger signal is a moving thermal signal;
wherein the motion sensor detects the moving trigger signal, such that the motion sensor interprets a simu- lated movement of the moving trigger signal as a physical movement, and thereby triggers the motion detector.

2. The motion sensor trigger system of claim 1, wherein the motion sensor is a passive infrared sensor.

3. The motion sensor trigger system of claim 1, wherein the moving thermal signal has a wavelength in a range of 5-15 microns.

4. The motion sensor trigger system of claim 1, further comprising:
   an external system, which is connected to the motion detector, such that the external system is activated when the motion sensor detects the moving trigger signal.

5. The motion sensor trigger system of claim 4, wherein the external system is a lighting system, such that the lighting system is switched on when the motion sensor detects the moving trigger signal.

6. The motion sensor trigger system of claim 1, wherein the trigger transmitter assembly comprises:
   a plurality of trigger transmitters;
   wherein each trigger transmitter in the plurality of trigger transmitters is activated in sequence in order to generate the moving trigger signal.

7. The motion sensor trigger system of claim 6, wherein the trigger transmitters are infrared emitting elements.

8. The motion sensor trigger system of claim 7, wherein the infrared emitting elements are thick-film carbon resistors, which are configured as heat emitting elements.

9. The motion sensor trigger system of claim 1, wherein the trigger assembly further comprises:
   at least one connector patch, which is mounted on the trigger body, such that the at least one connector patch is configured to be detachably attachable to the motion detector, such that the trigger transmitter assembly is positioned adjacent to the motion sensor.

10. The motion sensor trigger system of claim 1, wherein the trigger device further comprises:
    a control unit, which is configured to control activation of the trigger transmitter assembly, by sending the activation signal to the trigger transmitter assembly.

11. The motion sensor trigger system of claim 10, wherein the trigger device further comprises:
    a temperature sensor, which is configured to measure an ambient air temperature, such that the control unit increases a power sent to the trigger transmitter assembly, when the ambient air temperature is below a predetermined low temperature threshold.

12. The motion sensor trigger system of claim 11, wherein the predetermined low temperature threshold is in a range of 0° F.-35° F.

13. The motion sensor trigger system of claim 10, further comprising:
    a remote control device, which is configured to enable a user to send the activation signal to the control unit.

14. A motion sensor trigger system, comprising:
    a trigger device, comprising:
        a trigger assembly, comprising:
            a trigger transmitter assembly, which is configured to emit a moving trigger signal, which moves from a first side of the trigger transmitter assembly to a second side of the trigger transmitter assembly, when the trigger transmitter assembly receives an activation signal;
        wherein the moving trigger signal is a moving thermal signal;
        wherein the trigger device is configured to be connectable to a motion detector that includes a motion sensor, such that the motion sensor interprets a simulated movement of the moving trigger signal as a physical movement, such that the trigger transmitter assembly is adjacent to the motion sensor, such that the trimer transmitter assembly is on or near the motion sensor, such that the trigger transmitter assembly is within view of the motion sensor, whereby the motion sensor detects the moving trigger signal, and thereby activates the motion detector.

15. The motion sensor trigger system of claim 14, wherein the trigger transmitter assembly comprises:
    a plurality of trigger transmitters;
    wherein each trigger transmitter in the plurality of trigger transmitters is activated in sequence in order to generate the moving trigger signal.

16. The motion sensor trigger system of claim 15, wherein the plurality of trigger transmitters is two trigger transmitters.

17. The motion sensor trigger system of claim 15, wherein each trigger transmitter in plurality of trigger transmitters is configured to be independently positionable on the motion sensor.

18. The motion sensor trigger system of claim 14, wherein the trigger assembly further comprises:
    a) a trigger body; and
    b) at least one connector patch, which is mounted on the trigger body, such that the at least one connector patch is configured to be detachably attachable to the motion detector, such that the trigger transmitter assembly is positioned adjacent to the motion sensor.

19. The motion sensor trigger system of claim 14, wherein the trigger transmitter assembly comprises a plurality of transmitter members, such that each transmitter member comprises:
    a) a connector patch, which is detachably attachable to the motion detector, such that the transmitter member is detachably positionable on the motion sensor; and
    b) a trigger transmitter, which is connected to the connector patch.

20. The motion sensor trigger system of claim 15, wherein the trigger device further comprises:
    a control unit, which is configured to control activation of the trigger transmitter assembly, by sending the activation signal to the trigger transmitter assembly.

* * * * *